United States Patent [19]

Gilman

[11] 4,354,817

[45] Oct. 19, 1982

[54] COMPOSITE EXTRUSION DIE

[75] Inventor: Robert W. Gilman, San Francisco, Calif.

[73] Assignee: Ingersoll-Rand Company, Woodcliff Lake, N.J.

[21] Appl. No.: 290,380

[22] Filed: Aug. 5, 1981

[51] Int. Cl.[3] .............................................. A01N 35/00

[52] U.S. Cl. ...................................... 425/331; 425/466

[58] Field of Search .................... 425/331, 382 R, 464, 425/466

[56] References Cited

U.S. PATENT DOCUMENTS

| | | | |
|---|---|---|---|
| 3,427,685 | 2/1969 | Gove et al. | 425/464 |
| 3,469,280 | 9/1969 | Mott | 425/464 |
| 3,599,285 | 8/1971 | Hamilton | 425/464 |
| 3,599,286 | 8/1971 | Karet | 425/464 |
| 3,847,530 | 11/1974 | Hamilton | 425/382 R |
| 3,857,665 | 12/1974 | Kennedy | 425/382 R |
| 4,248,577 | 2/1981 | Borg et al. | 425/464 |
| 4,318,680 | 3/1982 | Heiffer et al. | 425/464 |

FOREIGN PATENT DOCUMENTS

| | | | |
|---|---|---|---|
| 2109607 | 9/1971 | Fed. Rep. of Germany | 425/382 |
| 374856 | 6/1932 | United Kingdom | 425/331 |

*Primary Examiner*—Jay H. Woo

*Attorney, Agent, or Firm*—Walter C. Vliet

[57] ABSTRACT

A composite extrusion die wherein large extrusion passageways are provided opening to the compression side of the die. Disposed within the extrusion passages towards the discharge side of the die are inserts having a plurality of smaller die passages. The construction provides for effective use of materials for both strength and wear resistance, provides a generous precompaction chamber and allows the concentration of heat buildup to occur locally in the die passage. The construction permits the use of readily formed ceramic or sintered metal inserts which may be mass produced and are readily interchangeable within the die matrix.

7 Claims, 3 Drawing Figures

COMPOSITE EXTRUSION DIE

BACKGROUND OF THE INVENTION

This invention relates to the extrusion of moldable material and more particularly to an extrusion die for use in such connection.

Conventional dies, whether cylindrical or planar, are provided with a plurality of extrusion holes therethrough. Moldable material to be extruded, is fed in bulk to the compression side of the die in front of rollers or other form of compression means, whereupon such material is compressed into the extrusion passages. If conditions are favorable, the material, after a number of passes of the compression means, emerges as a compacted string of material from each extrusion passage, from which material, pellets are formed by periodically fracturing or otherwise severing the extruded material as it emerges from the die.

Such dies have presented a number of problems. Moldable materials to be pelleted, vary widely in composition. Some are quite viscous, some difficult to consolidate, others compact readily hence die requirements are quite variable. A particular die might work well with one material and not even start with a material apparently differing but slightly from the other.

We found that enlarged openings on the die inlet side contribute to the versatility of the die. The mechanics of this are not fully understood, but are believed to be related to the working of the pad of material compressed between the roller and the die. In the conventional die, the material in the pad must be forced either directly or at least very locally into the die passage. This appears to require a closer match of die to the material than first forcing the material into a relatively larger opening, such as a precompaction chamber, and then extruding the desired pellet diameter.

Another problem encountered in connection with conventional dies, is that of die wear. Moldable material in most cases processes abrasive characteristics, and this results in considerable wear of the die face, particularly along the path or track of the compression means. When the holes do not accept the feed, the wear is aggravated because the material, under the action of the extrusion means, is partly or wholly forced out of and across the far edge of each entry under pressure, and such action produces wear at the edge of each hole along with wear of the die surface over which the extrusion means passes. This, of course, results in the development of heat and probably accounts in large measure for increasing the power/output ratio of the machine.

SUMMARY OF THE INVENTION

Among the objects of my invention are:

(1) To provide a novel and improved extrusion die and method of making the same;

(2) To provide a novel and improved extrusion die which is less critical than the conventional die and capable of effectively handling a range of moldable materials without difficulty;

(3) To provide a novel and improved extrusion die having increased output and pellet durability over a comparable conventional die for the same power input;

(4) To provide a novel and improved extrusion die in which the surface wear and hole wear is materially less than with a conventional die;

(5) To provide a die with large inlet openings on the compression side;

(6) To provide a die having multiple outlets from the relatively large inlets;

(7) To provide a die wherein the material of the die and the core inserts are of a different material;

(8) To provide a die wherein heat may be retained in the die passage;

(9) To provide a die having an interface between the core passages and the die matrix which inhibits heat transfer to the die matrix;

(10) To provide a die wherein ceramic core inserts are used to control heat flow from the die passages;

(11) To provide a die construction which permits the use of mass produced die elements which are interchangeable; and

(12) To provide a die construction which requires a minimum of radial drilling.

Additional objects of my invention will be brought out in the following description of a preferred embodiment. These and other objects are obtained in an extrusion die for a pellet mill of a type having compression means moveable over a surface of the die; the die having a compression side and a discharge side; a plurality of extrusion passages interconnecting the compression side and the discharge side; a heat and wear resistant insert disposed in each of the extrusion passages towards the discharge side of the extrusion passage; and the insert being provided with die passages extending through the insert from one side of the insert towards the compression side to one side of the insert towards the discharge side.

DESCRIPTION OF THE PREFERRED EMBODIMENT

Figure 1:
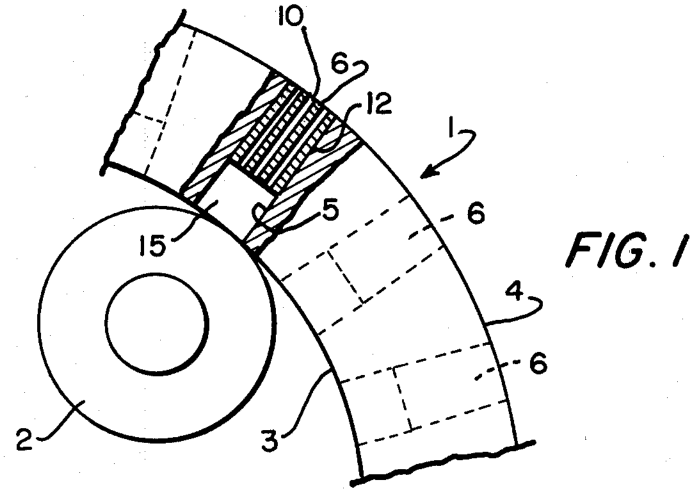
FIG. 1 shows a partial elevation of a circular pellet mill die and its cooperating force roller according to this invention.

Referring to the drawings for the details of the invention; a segment of a circular pellet mill die is shown in FIG. 1 generally designated as reference numeral 1. The overall configuration of these dies are well known in the industry and will not be described here. In the normal die, radial holes are drilled from the compression side 3 of the die to the discharge side 4 of the die. In the usual case, these radial holes form extrusion passages which are continuous and normally the same diameter from inlet to outlet.

Practice has been to provide these radial holes with conical inlet chambers and at various times and under various conditions with a nominal degree of counterboring 11 from either end to provide a precompaction chamber on the compression side or relief of the die passage on the discharge side.

In the present invention as shown in FIG. 1, the radial holes have been drilled to a much larger diameter than is customary to form an extrusion passage 5. In the particular form of the preferred embodiment, the extrusion passage is tapered inward from the compression side to the discharge side to act as a tapered plug retainer for the die passage insert 6. The insert 6 is provided with a plurality of die passages 10 which extend through the insert from the compression side to the discharge side. The compression side of the die is designated by the reference numeral 3 and the discharge side is designated by the reference numeral 4.

Figure 2:
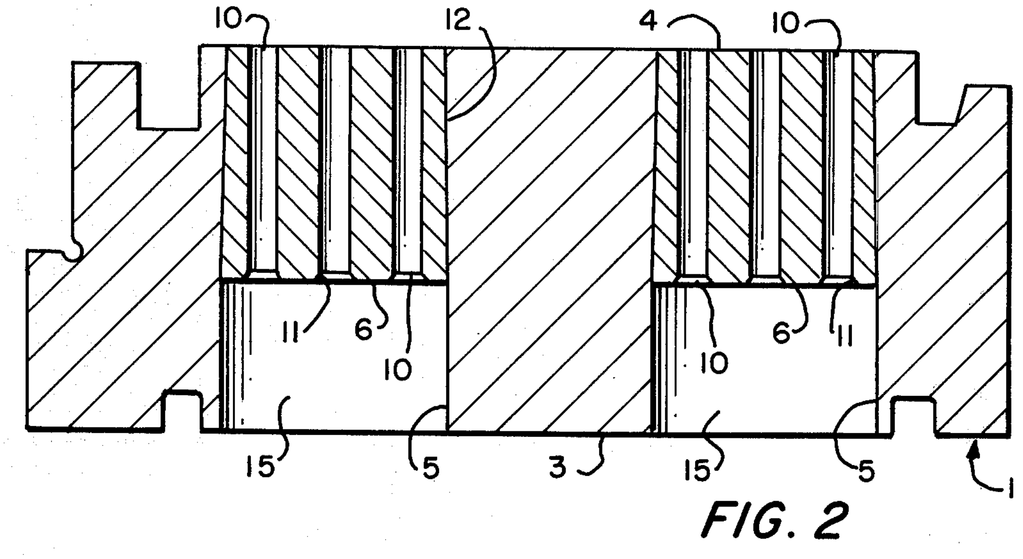
FIG. 2 is a cross section of the die showing the extrusion passage and die passage inserts.
Figure 3:
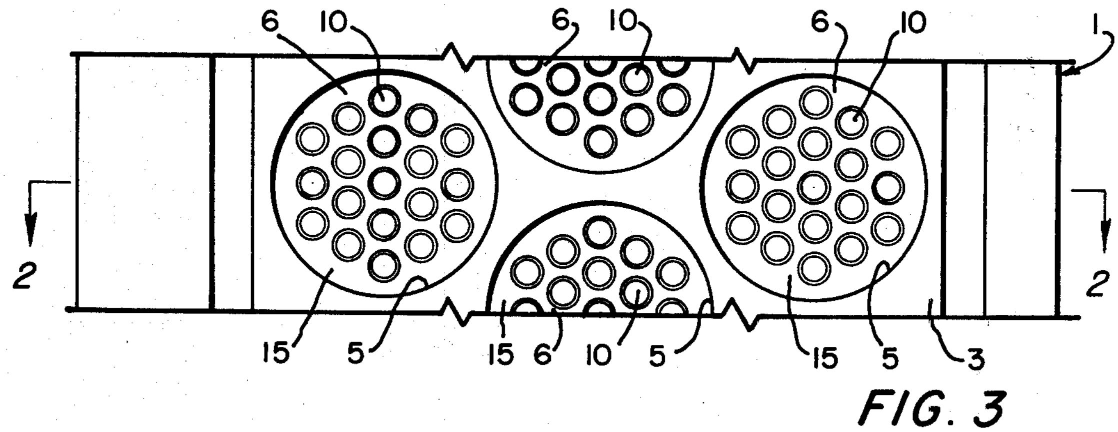
FIG. 3 is a partial plan view of the compression side of the die as viewed from the inside center.

It has been found that the use of a ceramic insert in the extrusion passage results in an unexpected increase in the production of these dies over conventional die configurations. It is thought that the increase in production results from the combination of a large precompaction chamber designated by the reference numeral 15 (as best seen on FIG. 2) and the retention of the heat created by compaction of the material and forcing it through the die passage 10 by means of the force roller 2.

The unique construction of this die further allows for the use of mass produced inserts which are forced into the die matrix in the extrusion passageway 5 and retained therein by the taper of the extrusion passage 5. The material of the insert 6 is chosen to provide a degree of resistance to heat transfer and an alternate construction of this is to provide an insulating barrier in interface 12 (as seen in FIG. 1) between the insert 6 and the die 1. Other forms of attachment may also be considered, such as the use of a shoulder or land to retain the insert, or a threaded construction.

Numerous variations of the invention will occur to those skilled in the art once the nature of the present invention is understood. In particular nineteen die passages 10 are shown in each of the extrusion passages 5. This number could vary from one to more than nineteen while retaining the advantages of a large compaction chamber and a heat retaining die passage insert. The particular construction allows the die passages to operate at a higher than normal temperature without transmitting the heat to the die matrix and thereby the die matrix operates at a lower temperature for a given throughput.

I do not wish to be limited in the scope of my invention except as claimed.

I claim:

1. An extrusion die for a pellet mill of a type having compression means movable over a surface of the die;

said die having a compression side and a discharge side;

a plurality of extrusion passages interconnecting said compression side and said discharge side;

a heat and wear resistant insert disposed in each of said extrusion passages towards said discharge side of said extrusion passage; and said insert being provided with die passages extending through said insert from one side of said insert towards said compression side to one side of said insert towards said discharge side.

2. An extrusion die according to claim 1 wherein: said insert has a plurality of said die passages.

3. An extrusion die according to claim 1 wherein: said inserts are manufactured of a heat resistant material, such as a ceramic material.

4. An extrusion die according to claim 1 wherein: said inserts are formed of a solid, wear-resistant material.

5. An extrusion die according to claim 4 wherein: said solid, wear-resistant material forms a heat insulating interface between said insert and said die.

6. An extrusion die according to claim 4 wherein: a heating insulating barrier is provided between said inserts and said extrusion passage.

7. An extrusion die according to claim 1 wherein: the die and the insert are of different materials best chosen for the primary function of each.

* * * * *